UNITED STATES PATENT OFFICE.

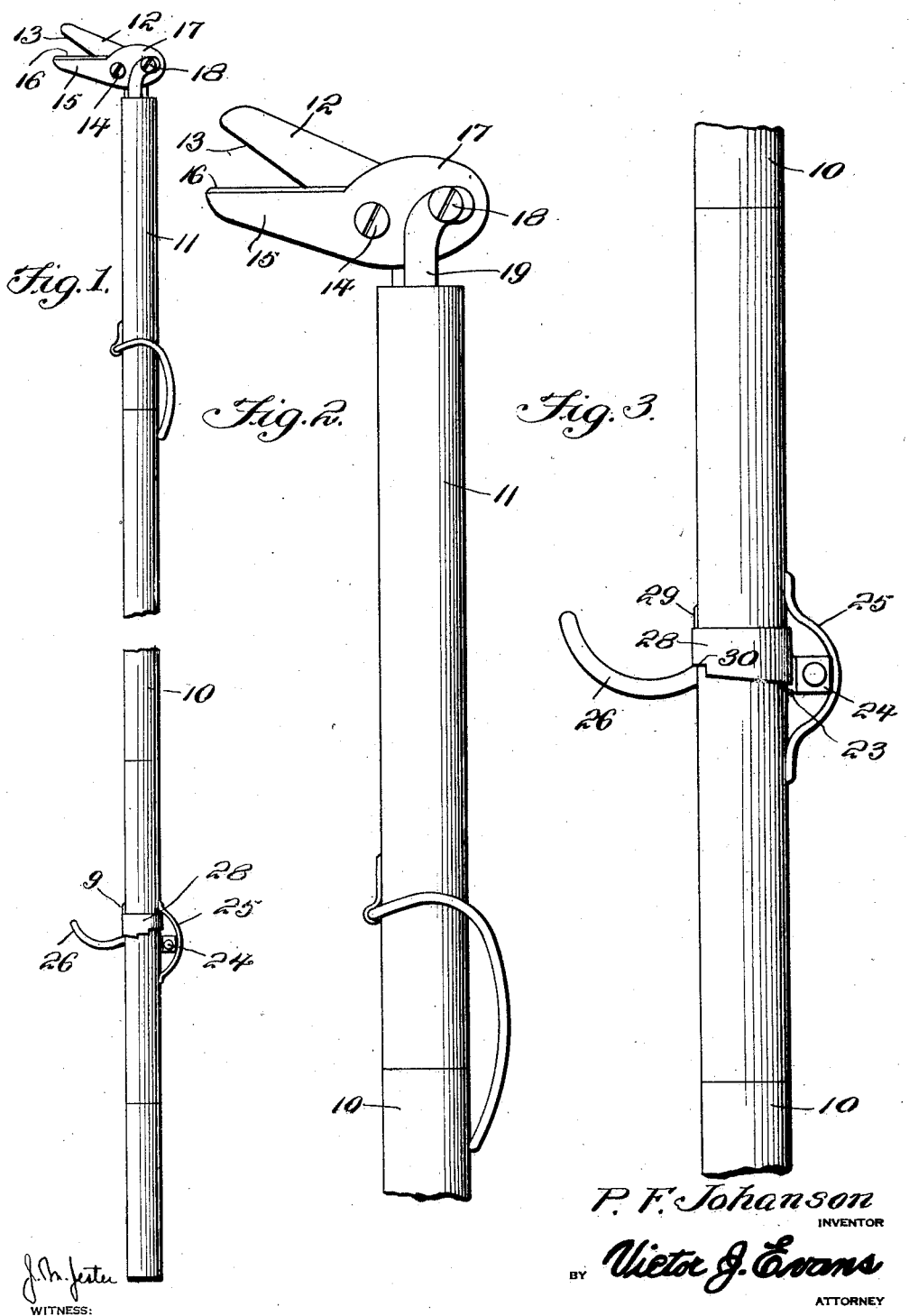

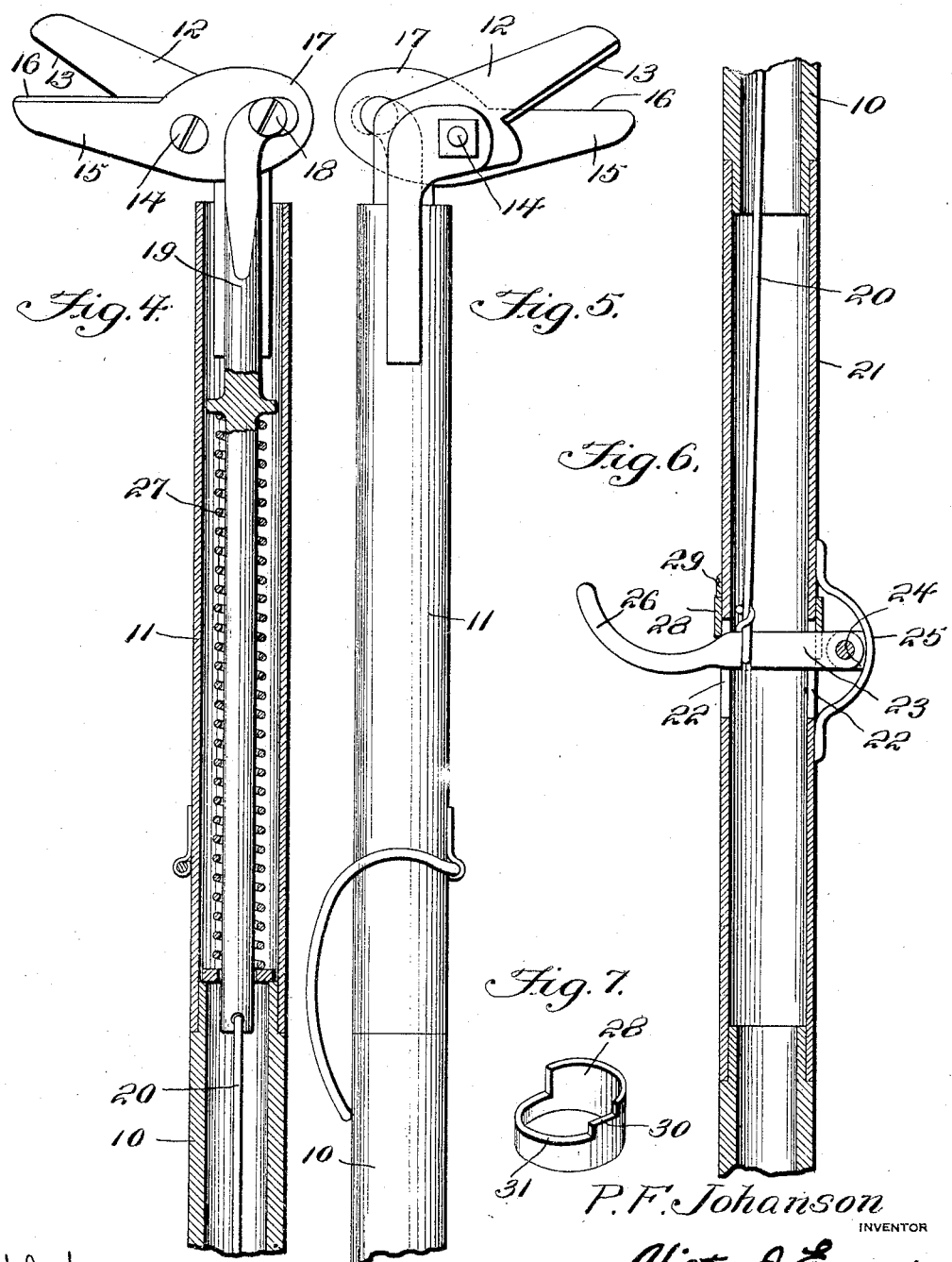

PER FRITIOF JOHANSON, OF TRAIL, OREGON.

FRUIT-THINNING IMPLEMENT.

1,378,791.  Specification of Letters Patent.  Patented May 17, 1921.

Application filed April 17, 1920. Serial No. 374,644.

*To all whom it may concern:*

Be it known that I, PER F. JOHANSON, a citizen of the United States, residing at Trail, in the county of Jackson and State of Oregon, have invented new and useful Improvements in Fruit-Thinning Implements, of which the following is a specification.

This invention relates to horticultural devices and has for its object the provision of a device whereby fruit growing too thickly upon trees may be quickly and easily thinned by cutting off the surplus fruit so that the remainder will attain a more vigorous growth.

An important object is the provision of a device of this character including a shear structure mounted upon the end of a pole and having an operating lever at the other end of the pole whereby the fruit may be reached in an easy and convenient manner, an important feature being the provision of means located adjacent the operating lever whereby to regulate the degree of opening of the shears.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the complete device,

Fig. 2 is a side elevation on an enlarged scale showing the shears end,

Fig. 3 is an enlarged side elevation of the operating lever and its adjacent parts, showing the adjusting ring in a different position from that shown in Fig. 1, Fig. 4 is a longitudinal sectional view through the head or shears end, Fig. 5 is an elevation showing the opposite side of the head or shears end from that shown in Fig. 2, Fig. 6 is a longitudinal sectional view through the operating lever and its associated parts, and Fig. 7 is a detail view of the adjusting ring detached.

Referring more particularly to the drawings, the numeral 10 designates a pole which may be of any suitable length and material and which is formed hollow. Secured upon one end of the pole 10 is the head of the device which is formed as a ferrule 11 having brazed or otherwise secured upon one end, a stationary blade 12 having a sharpened edge 13. Pivoted at 14 upon the stationary blade 12, is a movable blade 15 having a cutting edge 16 adapted to coöperate with the cutting edge 13 to constitute a shears. The movable blade 15 is prolonged rearwardly of its pivot point to provide an extension 17 and pivotally connected with this extension, as shown at 18, is an arm 19 which extends into the ferrule 11. Connected with the inner end of the arm 19 is a wire or other flexible member 20 which extends through the pole 10 to a point adjacent the other end thereof.

Secured upon the butt end of the pole is a cylindrical sleeve 21 provided at diametrically opposite points with slots 22. Extending through the slots is an operating lever 23 which is pivoted upon an ear 24 formed upon a bracket 25 secured to the sleeve 21. This lever has its projecting end curved in the shape of a trigger, as shown at 26, for convenient engagement by the operator's finger. The other end of the wire 20 is secured to the lever 23 within the pole or rather within the sleeve. Disposed within the ferrule 11 is a coil spring 27 which abuts at one end against the end of the pole and which has its other end abutting against the end of the arm 19. It will be observed that the function of the spring is to hold the cutting blades normally separated or in open position.

In the operation of the device it will be seen that the operator engages the stem of the fruit to be cut, between the blades whereupon movement of the trigger 26 will result in movement of the movable blade toward the fixed blade so as to effect cutting action. When the operator releases pressure upon the trigger it is obvious that the spring will reopen the shears.

In order to provide means for regulating the degree of opening of the shears, I provide a ring 28 which is disposed upon the sleeve 21 immediately in front of the trigger and this ring engages against a projection 29 on the under side of the sleeve. At one edge the ring is stepped or cut away to provide portions of different widths, as shown at 30 and 31. When the ring is rotated upon the sleeve 21 so that the widest portion of the ring engages the projection 29 and the trigger 26, it will be observed that the shears will open the minimum amount. By rotating the ring to bring the intermediate width or the narrowest portion between the projection 29 and trigger 26, the opening of the shears will be proportionately greater. In this way the degree of opening of the shears may be very conveniently and easily regulated from the butt end of the pole.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a hollow pole, a ferrule fixed upon one end thereof and carrying a stationary blade, a movable blade pivoted upon said fixed blade and having its rear end prolonged to provide an extension, an arm pivotally connected with said extension and extending into said ferrule, a wire connected with said arm and extending longitudinally within the pole, a coil spring on said wire and abutting at one end against the end of said arm and the adjacent end of the pole, a lever located at the butt end of the pole and pivotally connected therewith, said lever being connected with the other end of said wire, and means associated with said lever whereby to engage thereagainst for limiting movement thereof and consequently regulating the opening of the shears formed by said blades.

2. A device of the character described comprising a hollow pole, a fixed blade carried by one end thereof, a movable blade pivotally connected with the fixed blade, a cylindrical sleeve carried by the butt end of the pole, a lever extending transversely therethrough and pivotally mounted, a flexible member connected with said member and with the movable blade, a spring for normally holding said movable blade away from the fixed blade, and means for limiting the movement of the movable blade under the influence of the spring comprising a ring rotatably mounted on said sleeve and engaging said lever, said ring being stepped whereby to provide portions of different widths.

In testimony whereof I affix my signature.

PER FRITIOF JOHANSON.